United States Patent
Bondugula

(10) Patent No.: US 11,494,752 B1
(45) Date of Patent: Nov. 8, 2022

(54) SYSTEM AND METHOD FOR PRE-PAID SERVICES

(71) Applicant: Chandra Bondugula, Alpharetta, GA (US)

(72) Inventor: Chandra Bondugula, Alpharetta, GA (US)

( * ) Notice: Subject to any disclaimer, the term of this patent is extended or adjusted under 35 U.S.C. 154(b) by 102 days.

(21) Appl. No.: 17/087,584

(22) Filed: Nov. 2, 2020

Related U.S. Application Data

(60) Provisional application No. 62/929,773, filed on Nov. 1, 2019.

(51) Int. Cl.
    *G06Q 20/28*  (2012.01)
    *G06Q 20/40*  (2012.01)
    *G06Q 20/12*  (2012.01)
    *G06Q 20/10*  (2012.01)

(52) U.S. Cl.
    CPC ............ *G06Q 20/28* (2013.01); *G06Q 20/10* (2013.01); *G06Q 20/12* (2013.01); *G06Q 20/40* (2013.01)

(58) Field of Classification Search
    USPC .................................................... 705/35, 39
    See application file for complete search history.

(56) References Cited

U.S. PATENT DOCUMENTS

| | | | |
|---|---|---|---|
| 7,792,686 B2 * | 9/2010 | Allen ..................... | G06Q 10/10 709/200 |
| 8,249,893 B1 * | 8/2012 | Allen ................... | G06Q 20/351 705/2 |
| 9,760,871 B1 * | 9/2017 | Pourfallah ........... | G06Q 20/405 |
| 2012/0239417 A1 * | 9/2012 | Pourfallah ......... | G06Q 30/0601 705/2 |

FOREIGN PATENT DOCUMENTS

WO    WO-2012097310 A1 *  7/2012 ........... G06F 19/328

* cited by examiner

*Primary Examiner* — William E Rankins
(74) *Attorney, Agent, or Firm* — Patent Grove LLC; Tomas Friend

(57) ABSTRACT

A system and method for payment of services, especially health care services, at fixed prices allows a user to purchase a service card that is accepted by a service provider for full payment of a service. A card manager holds funds from the sale of the card and releases the funds to a service provider when documentation that the service has been provided is received.

16 Claims, 3 Drawing Sheets

Unique Card Identifier
Specific Service or Service Bundle
Price of Service
Service Provider
Card Manager Contact
Service Provider Contact
Calendar Date Range
Bar Code
Counterfeit Countermeasure

SYSTEM AND METHOD FOR PRE-PAID SERVICES

RELATED APPLICATIONS

This application claims priority to U.S. provisional application 62/929,773 filed Nov. 1, 2019.

BACKGROUND OF THE INVENTION

Field of the Invention

This disclosure relates to software implemented methods and computer based systems for prepayment and tracking of specified services.

Description of Related Art

Variability in the pricing of the same service provided to different customers, the same service provided during different time intervals, and the same service provided by different service providers are undesirable for customers, especially as they relate to expensive services or services lacking price transparency. For example, consumers of health care services in the U.S. typically do not know the total cost of a service in advance and people without insurance are typically charged a higher rate than an insurance company for the same service. While these problems are particularly acute in the U.S. health care industry, they are not unique to health care or a particular country. These problems also exist to a lesser extent in industries including dental care, automotive sales and repair, air travel, train travel, and hotel accommodations.

In the case of government funding of services, ensuring that the services are provided only to intended recipients is a concern, as is potential fraud on the part of service providers who may receive payment for services not delivered. Group funding of medical bills for life saving procedures, such as a collection jars at businesses and online funding sites also suffer from the risk of fraud. For those with health insurance, insurers may deny prior authorization for a medically necessary procedure, causing additional health risks and prolonging discomfort for patients. Payment of bills by insurers are often denied or delayed and medical practices require staff dedicated only to navigating hundreds of different insurance plans with different benefits, copayments, deductables, provider networks, and filing procedures.

Alternatives to current systems and methods for purchasing and selling health care services are needed for the benefit of health care consumers and health care providers. The alternative systems and methods for purchasing and selling health care services should control or reduce the cost of purchasing services as well as costs associated with providing services.

BRIEF SUMMARY OF THE INVENTION

Embodiments of the present invention preferably seek to mitigate, alleviate or eliminate one or more deficiencies, disadvantages or issues, such as the above-identified, singly or in any combination, by providing a system, a method, and a non-transitory computer-readable storage media described herein. The system and method provide for setting prices for specific services in advance and offering the sale of the services directly by a provider or through a third party. The system and method provide for linking services to real or virtual cards comprising unique identifiers linking specific service prices to specific service providers and specific users. The system and method may provide for registration and verification protocols designed to ensure that only the registered user assigned to each service card will receive the service specified by that service card. These and other advantages of the system and method for pre-paid services will become apparent in view of the following description of the invention.

BRIEF DESCRIPTION OF THE DRAWINGS

The accompanying drawings incorporated in and forming a part of this specification illustrate several aspects of the disclosure, and together with the description serve to explain the principles of the disclosure in which.

DETAILED DESCRIPTION OF EMBODIMENTS

Figure 1:
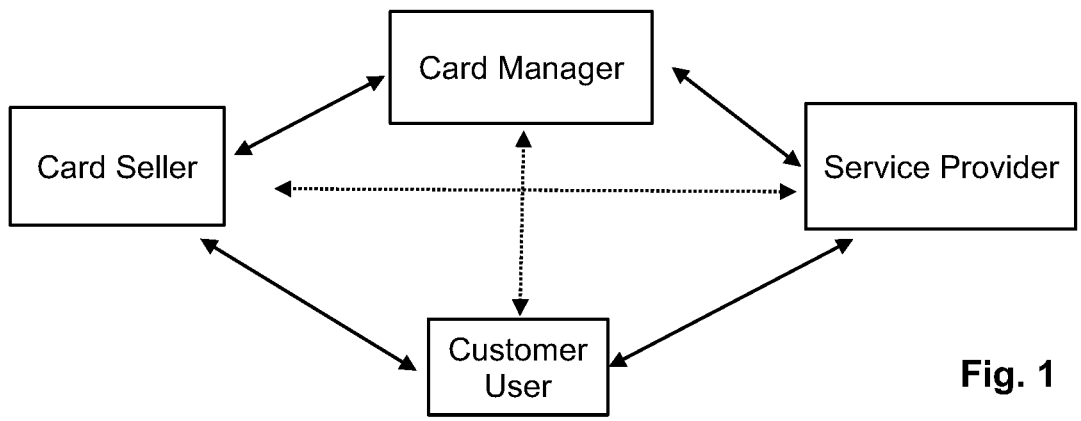
FIG. 1 is a diagram showing communications between functional components of a pre-paid service system.

Specific embodiments of the invention are described with reference to the accompanying drawings. This invention may, however, be embodied in many different forms and should not be construed as limited to the embodiments set forth herein; rather, these embodiments are provided so that this disclosure is thorough and complete, and fully conveys the scope of the invention to those skilled in the art. The terminology used in the detailed description of embodiments and illustrated in the accompanying drawings is not intended to be limiting of the invention. In the drawings, like numbers refer to like elements.

As used herein, a "service card" or "card" specifies a service or group of services for which the card is accepted as payment by a service provider. A service card may be a physical card made of plastic, laminate, or other material, such as those commonly used as gift cards sold at retail stores. A service card may additionally or alternatively be a virtual card, or digital card, that does not have a physical form but exists as stored data in a computer system and comprising the same information found on a physical card.

As used herein, a "card manager" or "manager" refers to the software and hardware components of a pre-paid service system that, together, perform functions required to manage the production and tracking of service cards, receive payments from the sale of service cards, register users of cards and service providers, and release payments to service providers when services have been provided.

As used herein, a "card vender" or "card seller" refers to the software and hardware components of a pre-paid service system that, together, perform functions required to sell service cards and to communicate with the card manager to direct transfers of funds from the sales of service cards to the control of the card manager.

As used herein, a "service provider" refers to the software and hardware components of a pre-paid service system that, together, perform functions required to register service providers with the card manager and communicate with the card manager to confirm services provided for which service cards are accepted as payment. The term "medical service provider" refers to a service provider associated with providing medical or health care services. Examples of medical services include diagnostic tests, medical exams, and medical treatments and may be provided by a medical service provider such as a primary care, urgent care, medical specialist, imaging, dental, surgical, or medical testing practice. Medical services provided by a medical service provider may consist of a single service specified on a card or may comprise a bundle of services specified on a service card. Dental services provided by a dental service provider may consist of a single service specified on a card or may comprise a bundle of services specified on a card. Examples of dental services include dental cleaning, examinations, x-rays, providing fillings, root canals, crowns, implants, and bridges, and orthodontist procedures.

A customer is a person or legal entity that buys, or pays for, one or more service cards. The customer may also be, but need not be, a user. If the service provided is a medical service or dental service, the user must be may be referred to as a patient. A customer need not intend or choose to redeem a card and may give a card to a user to be registered and redeemed or used.

The following description includes embodiments involving medical and non-medical services. It is understood that the invention is applicable to other pre-paid services as well as medical and dental services.

With reference to FIG. 1, a system for pre-paid services according to the invention involves interactions between different functional components, each of which may comprise a number of communicating modules configured to perform specific sets of tasks. A solid double arrow line indicates that an interface for direct communication between components is required. A solid double arrow line indicates that an interface for direct communication between components is optional.

A card manager component comprises modules that, together, direct or control the production, sale, and register service cards, card users, and service providers. The manager component comprises a seller interface module for exchanging information including inventory and usage status, using the unique identification of each card, with the seller module. Inventory information exchanged with a seller module may be associated with one or more physical locations of a retailer, one or more on-line retail sellers, and/or an in-house seller module of a provider. Usage status information may include whether a card has been sold, an amount of a payment toward the purchase of a card, whether it has been registered, the user to whom the card has been registered, and whether the card has been redeemed. The card manager component comprises a sales income interface configured to receive electronic funds transfer from the seller module based upon cards sold wholesale to the seller/vender and/or based upon the retail sales of cards. The manager component comprises a holding module configured to transfer at least a portion of income from the sale of each card into a holding account and to release funds to providers as the delivery of services to registered users are confirmed.

The card manager comprises a card generation module that creates sets of cards in a card database and may be configured to direct the production of physical and/or virtual cards to be sold using the card seller component. The card generation module comprises user interfaces for data entry by operators of the manager component and optionally interfaces with an order module accessible to providers for entering data on number of cards, price, service provided, provider information, and terms of service, for example.

The manager component comprises a provider interface module for exchanging information including registration status and usage status, using the unique identification of each card, with the provider component. Usage status information exchanged with the provider module may include the identity of the person to whom a card is registered and whether the service has been delivered. The provider interface module is configured to receive registration information regarding the provider. Provider information may include tax identification number (EIN), password(s), user name, business name, names and credentials of practitioners/employees associated with the provider, and lists of services provided. The provider interface module is configured to receive confirmation information verifying that the service has been rendered by the provider and/or received by the user. Validation that the service has been provided may include written acknowledgement by the user, a declaration by the provider, and/or validation information provided by a third party.

The manager component may comprise an optional user interface module configured for communicating with a user to receive information from the user to register a card to that user. The user interface module is configured to receive information establishing the identity of the user such as images of a driver's license or other identification card. The user interface module may also be configured to receive data for establishing an account such as password, user name, and email address.

A customer may purchase one or more cards by interacting with the card vender component. For example, a customer may purchase a service card online using a smart phone, tablet, or computer via a user interface module of the card seller component that is directly linked to the card manager at the same physical location. A customer may purchase a service card in a brick and mortar location remote from the card manager using a user interface that is operated by a person at the location to enter data required by the card manager. A vender may enter user information for the customer into the user interface module using a touch screen or keyboard or a customer may enter user information into the user interface module using a touch screen or keyboard on a vending machine comprising the vender component. If the vender location is a service provider providing the service(s) specified on the card(s), the card seller component may interface directly or indirectly with the service provider component at the location to provide data required by the service provider component and optionally the card manager component.

The card vender component comprises a manager interface module for exchanging information including inventory and usage status, using the unique identification of each card, with the manager component. Inventory information exchanged with the manager component may be associated with one or more physical locations of a retailer, one or more on-line retail sellers, and/or an in-house seller module of a provider. Usage status information may include whether a card has been sold, an amount of a payment toward the purchase of a card, whether it has been registered, the user to whom the card has been registered, and whether the card has been redeemed. The card seller component comprises a sales income interface configured to connect with the manager component for authorizing/directing electronic funds transfer to the manager component based upon cards sold wholesale to the seller/vender and/or based upon the retail sales of cards.

The card vender component may comprise a feature allowing the customer to print a receipt with a unique card identifier. Additionally or alternatively, the card vender/seller component at a remote location may comprise hardware and software for printing a physical card or physical card duplicate of an electronic service card. The card seller component may comprise a module configured to interface with an existing commercial payment gateway for online sales.

The card vender component of the system comprises software that tracks the inventory and sales of service cards and reports information on inventory and sales to the card manager portion, for example, via a wired or wireless internet connection. The card vender portion comprises a software module that causes funds from the sale of service cards to automatically be transferred into an account under the control of the card manager component. If the account is with a commercial bank separate from the card manager, the card manager and card seller components may each comprise a software module configured to interface with the commercial bank software.

The service provider component comprises a manager interface module for exchanging information including registration of the provider with the manager, registration status of and usage status cards, and verification of service delivery with the provider interface module of the manager component. The service provider component also comprises user interface module for receiving user information to register cards and confirm the identity of each registered user associated with each service card. User information may include images of a driver's license or other identification card and account information such as password, user name, and email address. When the service has been provided, the manager interface module sends information from the service provider to the provider interface of the card manager component that the specific service associated with a card has been provided to the registered user. The card manager component causes the release of funds associated with the service provided from the holding account to the control of the service provider portion which may, for example, transfer the funds into an account controlled by the service provider or direct the automated printing and mailing of physical checks.

A customer may be, but need not be the user. A service card may be purchased by one person or entity and given to a user. For the card to be used, a user must register the card with the card manager so as to establish a connection between a specific, identified user and a specific card having a unique identifier, such as a unique number, bar code, or RFID chip code. Proof of identity may be, for example, by social security number, driver's license number, or image of photo ID. The card is preferably registered directly with the manager by the user online but may be registered using a card vender component, a service provider component, or by manual data entry into the manager component. Alternatively, the card may be registered to a business entity that will receive service(s) specified by the card. Additionally or alternatively, a user may take the service card or a receipt with the card's unique identifier to a either a remote service provider location or a remote card seller location and register the card with the aid of a person entering data for the user into a card seller component user interface at the remote location. This may be particularly useful for users with visual or cognitive impairments and users that are not literate. Additionally or alternatively, the user may register the card by interacting with a person, for example via telephone or e-mail, who enters data manually into the card manager component software to register the user. The person entering the data may be associated with the card manager directly, may enter data indirectly into the card manager software through a card vender component interfaced with the card manager software component, or indirectly into the card manager software through a service provider component of the system interfaced with the card manager software component. The double arrow between the customer/user is dashed because communication between the card manager component and the customer and/or the user can be indirect via the card seller component or the service provider component.

Figure 2:
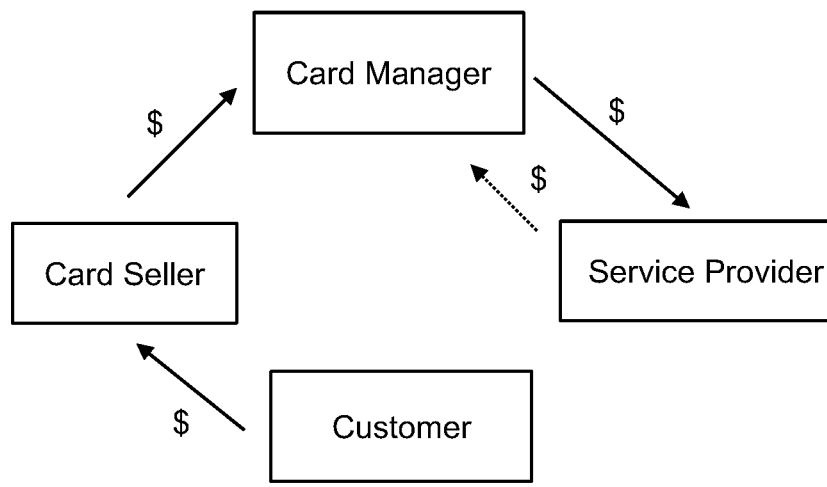
FIG. 2 is a diagram showing movement of funds by and between components of a pre-paid service system.

With respect to FIG. 2, the flow of funds directed by the system is shown using solid arrows for required flow and a dashed arrow for optional flow. The card manager component receives funds from card seller component, which requires payment from a customer for the sale of a cards. The hardware and software of the card seller component may be physically remote from the card manager component or may be embodied as one or more modules of the card manager component. The service provider component receives funds after the card manager component receives confirmation that the service has been provided. The service provider component may cause the transfer funds to an operator of the card manager, for example when the service provider location comprises a card seller component or if the operator of the service provider component pays a subscription and/or registration fee to the operator of the card manager.

Figure 3:
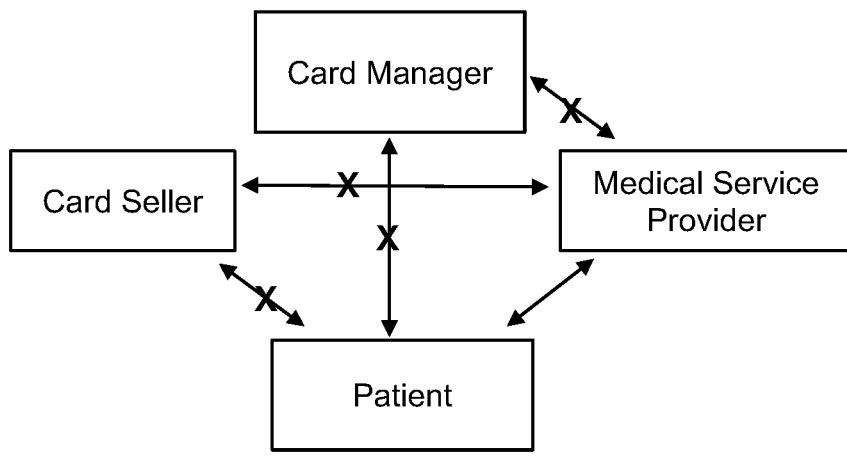
FIG. 3 is a diagram showing control of medical information by and between components of a pre-paid medical service system.

With respect to FIG. 3, an example of confidential patient data flow for an embodiment involving medical services is shown. The medical service provider component may comprise a software module preventing inadvertent transmission of patient medical information to any other component of the pre-paid service system. This is indicated in FIG. 3 by "X" on arrows between the components. Additionally or alternatively, any one or more of the other components may comprise a software module preventing receipt of medical information from the medical service provider software.

Figures 4, 5:
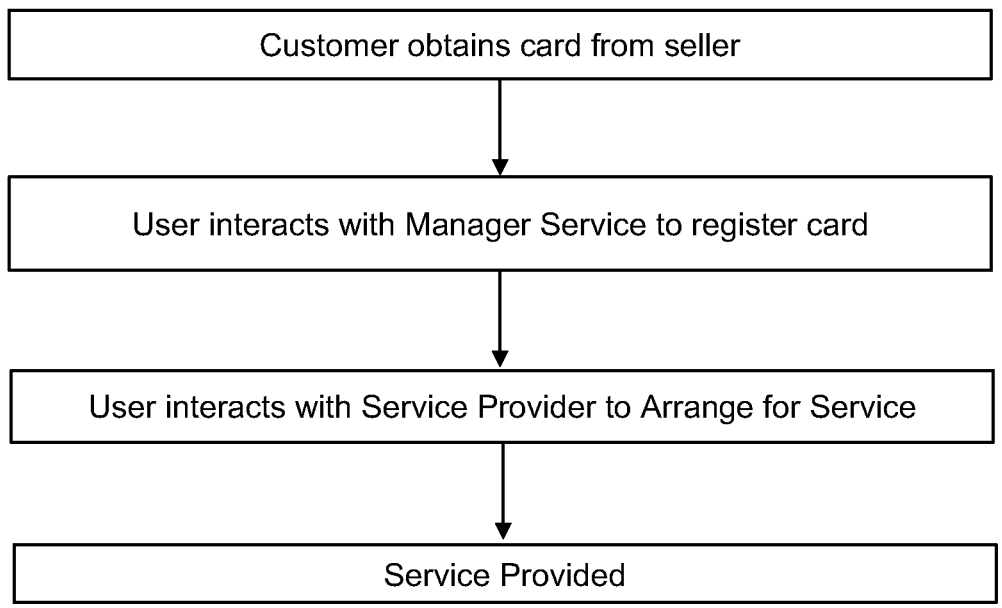
FIG. 4 illustrates an example of a card of a pre-paid service system.
FIG. 5 is a flow chart showing an example of interactions between a user and user interface components of a pre-paid service system.

FIG. 4 illustrates an example of a medical service card comprising information that may be present on a physical card or a virtual, electronic card. The example shown in the figure is not drawn to scale and it may have any suitable alternate shape or size and serves as a prepaid card which maybe utilized for a specified medical service such as a medical consultation, diagnostic test, or medical treatment for a fixed price specified on the card. Additionally or alternatively, the card may specify different prices associated with different service providers listed on the card. Information displayed on a physical and/or an electronic medical service card may include the specific service or bundled services to be provided, the purchase price of the card/service, the identity of service provider(s) where the card is accepted as full payment for the service, a unique identifier for that card, a date range within which the card must be used, an expiration date by which the card must be used, a geographical region within which the card is valid or invalid, terms of service, conditions that may apply to the use of the card, contact information for the service provider(s) and/or the card manager, and contact information for a help line. The card may display a score, for example from a rating system, indicating the rating of the service provider or several service providers.

One or more logos may be present to indicate the identities of the card manager operator and/or the service provider(s). One or more pictograms, photos, symbols, colors, and/or drawings may be displayed on the card to indicate the service(s) specified and/or the valid geographic location. These types of markings are useful for quick reference and to assist customers and users that are not literate or proficient in the language in which the card is written. From the point of view of a customer/user an example of steps for obtaining and using the card are illustrated in FIG. 5.

Figure 6:
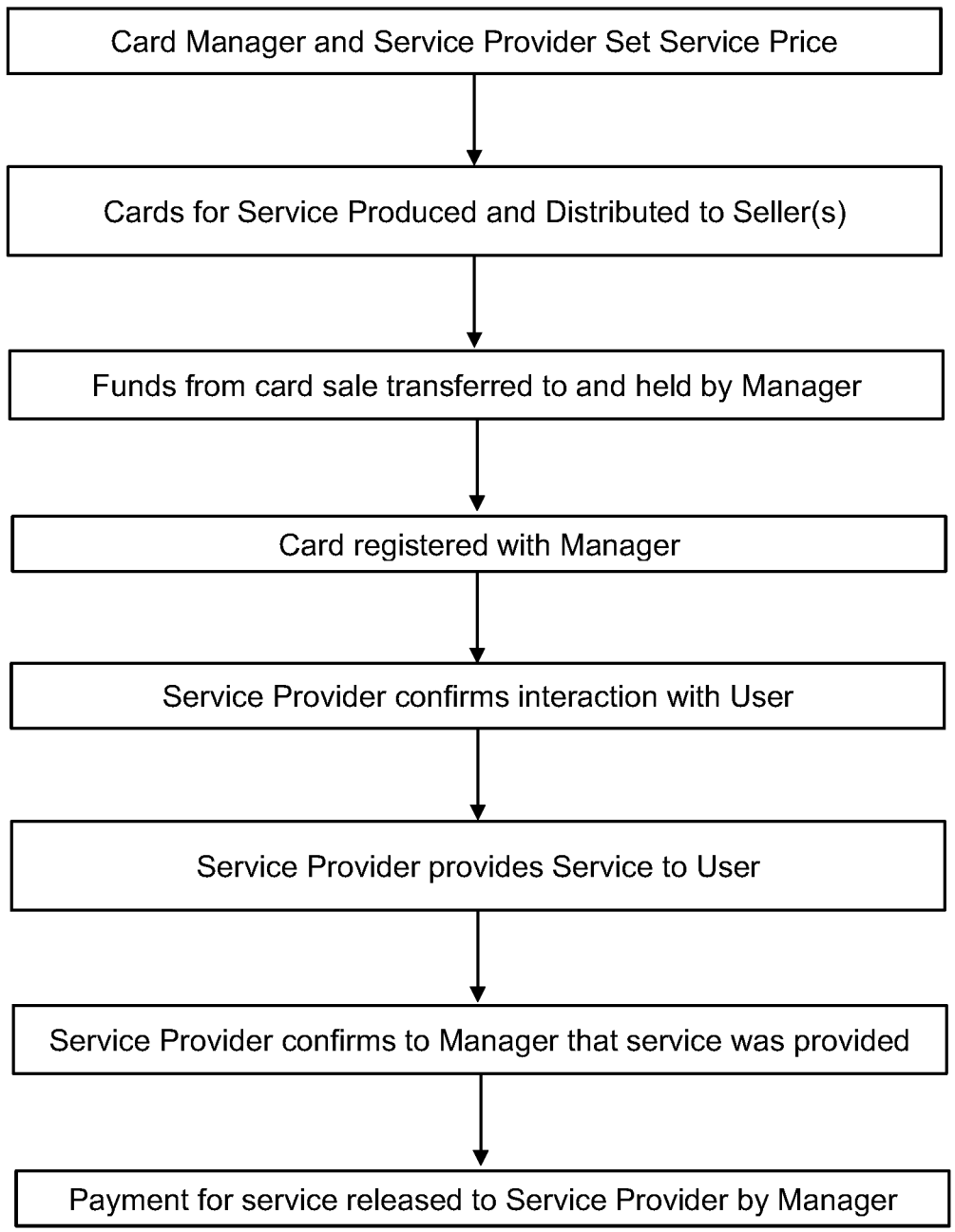
FIG. 6 is a flow chart showing an example of functional steps involved in a method for pre-payment of a service from the point of view of the card manager.

FIG. 6 illustrates an example of steps involved a method of making and using a specific pre-paid service card via a user interface of the card manager component. For a given card for a given service, and associated price, the price, service, and service provider(s) are entered into the card manager software. The price may be taken from a request for card production by one or more service providers and/or one or more card venders, for example. One or more cards of physical and/or electronic type are produced by or at the direction of the card generation module, each with a specific card identifier and optionally distributed to venders/sellers. The card generation module may be configured to receive data required for card production and direct a machine or computer to produce physical and/or digital/electronic cards. Additionally or alternatively, the card generation module may configured to communicate with a separate card and/or digital card manufacturer to provide instructions regarding the production and distribution of cards.

When cards are sold, the vender/seller interface receives data regarding the unique identity of the card and the holding module directs at least a portion of received funds from the sale to a holding account, for subsequent transfer to the service provider component when confirmation has been received that the service has been provided. The funds are preferably received directly via electronic funds transfer into an account accessible to the card manager component.

When a user presents a registered card to a registered service provider that accepts the card, the service provider component receives data regarding the user and registered card through the user interface and transmits this data to the provider interface module for verification with the provider interface of the manager component. Upon receipt of a positive verification message from the manager component, the service provider provides the service in the usual way, for example by scheduling an appointment or service date. When the service has been performed, evidence regarding the completion of the service is entered into the service provider component software and transmitted to the card manager component via the provider interface. The card manager component releases funds associated with the card from the holding account into the control of the service provider component, for example via interface with a bank to transmit payment of the funds to an account associated with the service provider business.

The card generation module may be configured to receive data to create a master configuration by selecting data for entry via a user interface into such as the name of the service being pre-purchased, geographical region(s) such as cities, counties, or states where the card is accepted as payment, date range(s) during which the card must be registered and/or service must be provided, and card appearance such as color scheme or template theme and to store the card configuration for ordering.

The manager component may comprise a sales module configured for creating sales orders for batches of cards, optionally using a stored card configuration. Data is entered into the system through a user interface including data such as the service being provided, a quantity of cards to be produced, the form(s) of the cards with respect to physical and/or digital, the price of the cards, and the geographical region(s) and/or jurisdictions of validity and/or distribution. Once a sales order is created, details such as sales order, test name, color scheme, price, quantity, valid time window and actions taken may be displayed for review and possible corrections or edits. Additionally or alternatively, the card order module may be configured for purchase order generation by entry of data through a user interface regarding card vender identity(ies), commission rate(s), quantities of cards, and type(s) of cards.

The sales module may be configured for online sales, optionally with options for selecting a location of the customer/user and search engine for service cards available in the selected location. The search engine may comprise a map search function, search by service function, and/or search by price and/or service provider rating function. An online seller module may provide an option for registering a group funding linked to a service card with a pre-defined user. An online seller module may provide discounted prices for bulk card sales.

The invention claimed is:

1. A system for pre-payment of services, said system comprising:
a card manager component comprising software configured to manage: production of cards, registration of cards with the manager component, receipt of funds from sales of cards, and disbursement of funds to a service provider;
a card vender component comprising software configured to communicate with the card manager component for selling cards to customers; and
a service provider component comprising software configured to communicate with the card manager component for registering the service provider component with the card manager component, providing services to a registered service user, and confirm that a service has been provided to the registered user;
wherein:
each card comprises information specifying the service to be performed for the user of the card, a unique card identifier, and a price of the card;
the card manager component software is configured to:
place orders for the cards, communicate with the card vender component to receive funds from sales of the cards and hold at least a portion of the funds until confirmation of service delivery is received;
receive information from users of the cards to register each card with a specific user to receive the service specified by the card;
release funds to the service provider component when confirmation that services have been provided is received; and
communicate with service provider component to receive confirmation of services performed for registered cards and users; and
the card vender component comprises computer software configured to receive payment for cards, transmit information of the sale of each card to the card manager component and transfer funds to the control of the card manager component;
the service provider component comprises software configured to:
communicate with the card manager to register and maintain registration with the service provider;
receive data specific to each registered user; and transmit to the card manager confirmation of having provided the service specified on the card.

2. The system of claim 1, wherein said service provider component is a medical service provider component or dental service provider component, and said service is a medical service or a dental service.

3. The system of claim 2, and further comprising software configured to prevent patient medical information from being transmitted to, or being received by, said card manager.

4. The system of claim 1, wherein the service provider component further comprises software configured for registering a card with the card manager component.

5. The system of claim 1, wherein the card vender component further comprises software configured for registering a card with the card manager component.

6. The system of claim 1, wherein the manager component comprises a holding module configured to transfer at least a portion of income from the sale of each card into a holding account and to release funds to providers as the delivery of services to registered users are confirmed.

7. The system of claim 1, wherein the card manager comprises a card generation module that creates sets of cards in a card database and is configured to direct the production of physical and/or virtual cards that are to be sold using the card seller component.

8. The system of claim 7, wherein the card generation module comprises user interfaces for data entry by operators of the manager component and interfaces with an order module that is accessible to providers for entering data on number of cards, price of cards, service provided, provider information, and terms of service.

9. The system of claim 1, wherein the service provider component comprises a provider interface module configured for using the unique identifier of each card to exchange information including a name of a person to whom the card is registered, whether the service associated with the card has been delivered, and an identity of a service provider accepting the card.

10. The system of claim 9, wherein the provider interface module is further configured receive information from the service provider including a list of services provided by the service provider and credentials of employees associated with the service provider.

11. The system of claim 9, wherein the provider interface module is further configured to receive validation from the service provider that the service associated with the card has been provided and wherein the validation comprises a written acknowledgement by the user, a declaration by the provider or validation information provided by a third party.

12. The system of claim 9, wherein the service provider interface module is configured to receive information establishing an identity of the user using an image of an identification card.

13. The system of claim 12, wherein the user interface module is configured to receive data for establishing an account said data including a password and a name.

14. The system of claim 1, wherein the card vender component comprises a manager interface module for exchanging information including card inventory and card usage status, using the unique identification of each card, with the manager component.

15. The system of claim 1, wherein card vender component is configured to allow a customer to print a receipt with the unique card identifier.

16. The system of claim 1, wherein the card vender component comprises hardware and software for printing a physical card, or a physical card duplicate, of an electronic service card.

* * * * *